US010682641B2

(12) United States Patent
Bewsey

(10) Patent No.: US 10,682,641 B2
(45) Date of Patent: Jun. 16, 2020

(54) ION EXCHANGE PROCESS

(71) Applicant: TRAILBLAZER TECHNOLOGIES (PTY) LTD, District Krugersdorp (ZA)

(72) Inventor: John Arthur Bewsey, Cape Town (ZA)

(73) Assignee: TRAILBLAZER TECHNOLOGIES (PTY) LTD, Krugersdorp (ZA)

(*) Notice: Subject to any disclaimer, the term of this patent is extended or adjusted under 35 U.S.C. 154(b) by 489 days.

(21) Appl. No.: 15/303,934

(22) PCT Filed: Apr. 15, 2015

(86) PCT No.: PCT/IB2015/052744
§ 371 (c)(1),
(2) Date: Oct. 13, 2016

(87) PCT Pub. No.: WO2015/159232
PCT Pub. Date: Oct. 22, 2015

(65) Prior Publication Data
US 2017/0028395 A1    Feb. 2, 2017

(30) Foreign Application Priority Data

Apr. 15, 2014 (ZA) ................................. 2014/02757

(51) Int. Cl.
*B01J 39/18* (2017.01)
*B01J 41/12* (2017.01)
(Continued)

(52) U.S. Cl.
CPC .............. *B01J 47/10* (2013.01); *B01J 39/12* (2013.01); *B01J 39/18* (2013.01); *B01J 41/12* (2013.01);
(Continued)

(58) Field of Classification Search
CPC combination set(s) only.
See application file for complete search history.

(56) References Cited

U.S. PATENT DOCUMENTS 2,697,724 A * 12/1954 Collier .................... B01J 47/10
210/189
3,617,554 A * 11/1971 Thorborg ................ B01J 47/10
210/664
(Continued)

FOREIGN PATENT DOCUMENTS

CN    1304889 A    7/2001
CN    1771089      5/2006
(Continued)

OTHER PUBLICATIONS

The Essential Chemical Industry, Chemical reactors, Mar. 2013, pp. 1-8 (Year: 2013).*
(Continued)

*Primary Examiner* — Bobby Ramdhanie
*Assistant Examiner* — Michael J An
(74) *Attorney, Agent, or Firm* — Ballard Spahr LLP

(57) ABSTRACT

Disclosed herein is a process for carrying out an ion exchange process which involves providing two interacting sets of banks of continuously stirred tank reactors (CSTR's) each containing a bed of ion exchange resin and causing the resin to move in one direction through each bank of reactors and the feed solution and/or or eluant in the opposite direction. In carrying out the process, a feed solution is introduced in a first reactor causing dissolved ions to be captured on the resin, eluant is introduced into a reactor upstream of the first reactor in the direction of resin movement causing ions captured on the resin to be removed into the eluant and eluant rich in ions removed from the resin will be taken from a reactor upstream of the reactor in which the eluant was introduced, for further processing. Thus, in this form of the invention there is, in effect, a loading bank of reactors in which ions from the feed solution are captured followed by a regenerating bank of reactors in which the
(Continued)

eluant removes the ions captured on the resin and regenerates the resin.

21 Claims, 2 Drawing Sheets

(51) Int. Cl.
<table>
<tr><td>B01J 47/10</td><td>(2017.01)</td></tr>
<tr><td>B01J 49/00</td><td>(2017.01)</td></tr>
<tr><td>C02F 1/42</td><td>(2006.01)</td></tr>
<tr><td>B01J 39/12</td><td>(2006.01)</td></tr>
<tr><td>B01J 49/16</td><td>(2017.01)</td></tr>
</table>

(52) U.S. Cl.
CPC .............. B01J 49/16 (2017.01); C02F 1/42 (2013.01); *C02F 2001/422* (2013.01); *C02F 2001/425* (2013.01)

(56) References Cited

U.S. PATENT DOCUMENTS

<table>
<tr><td>5,279,744</td><td>A *</td><td>1/1994</td><td>Itoh ....................... C07C 227/40<br>210/676</td></tr>
<tr><td>6,375,851</td><td>B1 *</td><td>4/2002</td><td>Sterling ............. B01D 15/1828<br>210/677</td></tr>
<tr><td>2004/0204509</td><td>A1</td><td>10/2004</td><td>Bollinger et al.</td></tr>
<tr><td>2010/0305290</td><td>A1 *</td><td>12/2010</td><td>D'Haene ................. C08F 6/008<br>526/315</td></tr>
</table>

FOREIGN PATENT DOCUMENTS

<table>
<tr><td>EP</td><td>1110914 A2</td><td>6/2001</td><td></td></tr>
<tr><td>WO</td><td>WO 2012/042483</td><td>4/2012</td><td></td></tr>
<tr><td>WO</td><td>WO 2012/042483 A1 *</td><td>4/2012</td><td>................ C02F 1/42</td></tr>
<tr><td>WO</td><td>WO 2014/043322 A1</td><td>3/2014</td><td></td></tr>
</table>

OTHER PUBLICATIONS

Bewsey, J. (2014) AMD Back to the Land, TCE Today—The Chemical Engineer, No. 874, pp. 32-36.

International Search Report dated Sep. 4, 2015 for Application No. PCT/IB2015/052744, which was filed on Apr. 15, 2015 and published as WO/2015/159232 dated Oct. 22, 2015 (Applicant—Trailblazer Technologies (PTY) LTD.) (3 Pages).

Written Opinion dated Sep. 4, 2015 for Application No. PCT/IB2015/052744, which was filed on Apr. 15, 2015 and published as WO/2015/159232 dated Oct. 22, 2015 (Applicant—Trailblazer Technologies (PTY) LTD.) (6 Pages).

Zhao Wenyuan, Chemical Industry Press, 1st edition, 1st press, Mar. 2008, p. 290 (publication date: Mar. 31, 2008.

* cited by examiner

ION EXCHANGE PROCESS

CROSS-REFERENCE TO RELATED APPLICATIONS

This application is a U.S. National Phase Application of International Application No. PCT/IB2015/052744, filed Apr. 15, 2015, which claims priority to South African Patent Application No. 2014/02757, filed Apr. 15, 2014, each of which are hereby incorporated by reference in their entirety.

BACKGROUND OF THE INVENTION

This invention relates to an ion exchange process.

The plug flow process for operating ion exchange runs by having ion exchange resin (IOR) filled into suitably designed columns with the feed solution being fed vertically upward or downward, as desired, entering first one column and then on to the next absorbing the TDS (total dissolved solids) and exchanging the target cations for $H^+$ and the target anions for $OH^-$. The final water will emerge being essentially free of TDS and neutral—the exchanged $H^+$ and $OH^-$ having neutralised each other to produce further water. When the first catex column has become exhausted this one will be taken out of service—by changing a suite of valves—and be rinsed free of the feed water and then be regenerated by an acid to reverse the exchange procedure, exchanging the extracted target cations for $H^+$ back onto the resin. Any residual acid will have to be rinsed off the resin before this regenerated column is returned back to service in the extraction train of columns. The exact but opposite routine is operated for the anex columns but that alkali is used to replenish the $OH^-$ sites on the anex resins. This process is repeated on a never ending routine so that fresh resin is always presented to the incoming feed water and the columns are taken out of service on a carousel-like fashion after rinsing to be regenerated as needed.

The entire above configuration is expensive and extremely cumbersome to design, build and to operate and requires large amounts of good quality rinse water in between each operation to prepare the various columns for service.

Ion exchange processes can also be carried out in a continuously stirred tank reactor (CSTR). In such a process the ion exchange resin is contained in its own tank by a screen at the top of the tank that allows the water phase to overflow into a collection gutter while the OR circulates inside the tank to give good mixing of the resin with the water phase to achieve the exchange needed. The IOR can be kept in suspension by designing the CSTR's in a conical fashion so that the vertical flow rate is greatest at the bottom of the tank and slowest at the top. It is also desirable to stir the contents by using an external pump which only contacts the water phase thus ensuring that the IOR never gets sheared by a fast moving pump impeller. Alternatively the CSTR can be stirred by a specially selected gentle aerofoil stirrer to keep the IOR uniformly dispersed in the reactor.

SUMMARY OF THE INVENTION

According to the invention, a process for carrying out an ion exchange process involves providing two interacting sets of banks of continuously stirred tank reactors (CSTR's) each containing a slurry of ion exchange resin and causing the resin to move in one direction through each bank of reactors and the feed solution and/or or eluent, countercurrent, in the opposite direction, the interacting sets of banks of CSTR's comprising:

a first set of banks of catex CSTR's containing a cation exchange resin and comprising:
 a loading bank of catex CSTR's in which cations from a feed solution are captured, and
 a regenerating bank of catex CSTR's reactors in which the eluent removes the cations captured on the resin and regenerates the cation exchange resin; and
a second set of banks of anex CSTR's containing an anion exchange resin and comprising:
 a loading bank of anex CSTR's in which anions from a feed solution are captured, and
 a regenerating bank of anex CSTR's reactors in which an eluent removes the anions captured on the anion exchange resin and regenerates the anion exchange resin;

wherein:
 i) a feed solution is passed through the loading bank of the catex CSTR's causing dissolved cations to be captured on the cation exchange resin, to provide a loaded cation exchange resin and a feed solution depleted of cations;
 ii) the loaded cation exchange resin is passed through the regenerating bank of catex CSTR's to provide a regenerated cation exchange resin which is recycled to the loading bank of catex CSTR's;
 iii) the feed solution depleted of cations is passed from the loading bank of catex CSTR's through the loading bank of the anex CSTR's causing dissolved anions to be captured on the anion exchange resin, to provide a loaded anion exchange resin and an effluent solution depleted of cations and anions; and
 iv) the loaded anion exchange resin is passed through the regenerating bank of anex CSTR's to provide a regenerated anion exchange resin which is recycled to the loading bank of anex CSTR's.

The loading bank of catex CSTR's, regenerating bank of catex CSTR's, loading bank of anex CSTR's and regenerating bank of anex CSTR's may each comprise 2 to 8, preferably 3 to 6, most preferably 2 to 4 CSTR's.

Preferably at least one, more preferably 2 to 4, most preferably 2 to 3, CSTR's adapted to wash regenerated resin are provided in between the regenerating bank and loading bank of catex CSTR's.

Preferably at least one, more preferably 1 to 4, most preferably 1 to 2, washing CSTR's adapted to wash regenerated resin are provided in between the regenerating bank and loading bank of anex CSTR's.

Preferably, when the resin is moved between the CSTR's in the loading bank of catex CSTR's, regenerating bank of catex CSTR's, loading bank of anex CSTR's and regenerating bank of anex CSTR's, respectively, the resin is passed over a screen which separates water from the resin, preferably a moving screen such as a screen located in a rotating drum, which removes water from the resin by gravity and returns the water to the CSTR.

The resin may be rinsed with water and excess water removed using a vacuum at one or more of the following locations in the process:
 between the loading bank and regenerating bank of catex CSTR's;
 between the regenerating bank of catex CSTR's and the catex washing CSTR's;
 between the catex washing CSTR's and catex loading bank of CSTR's;

between the loading bank and regenerating bank of anex CSTR's;

between the regenerating bank of anex CSTR's and the anex washing CSTR's;

between the anex washing CSTR's and anex loading bank of CSTR's.

The process may include a water addition and recycling system in which:

clean water is added to a washing CSTR connected to the loading bank of CSTR's in the anex set;

water from a washing CSTR connected to the regenerating bank of CSTR's in the anex set is added to a washing CSTR connected to the loading bank of CSTR's in the catex set;

water from a washing CSTR connected to the regenerating bank of CSTR's in the anex is added to the feed solution depleted of cations which is added to the loading bank of CSTR's in the anex set.

Eluent from a CSTR in the loading bank of the catex set may be diverted to a CSTR in the loading bank of the anex set, and eluent from a CSTR in the loading bank of the anex set may be diverted to a CSTR in the loading bank of the catex set.

The process finds particular application in the treatment of acid mine drainage (AMD).

The cation exchange resin may be a strong acid IX resin with a mean particle size of 0.50 to 0.75 mm and a density of 1.0 to 1.5 gms/ml, preferably Amberjet™ 1500H supplied by the Dow Chemical Company The anion exchange resin may be a weak base IX resin having a mean particle size of 0.50 to 0.75 mm and a density of 1.0 to 1.5 gms/ml, preferably Amberlite™ IRA 92 supplied by the Dow Chemical Company.

The eluent in the catex regenerating bank of CSTR's is an acid such as nitric acid ($HNO_3$), most preferably 10 to 20% nitric acid ($HNO_3$).

The eluent in the anex regenerating bank of CSTR's is a base such as ammonium, sodium or potassium hydroxide, preferably ammonium hydroxide ($NH_4OH$), most preferably 5 to 10% ammonium hydroxide ($NH_4OH$).

Preferably, each CSTR operates continuously with a constant stream of solution/eluent entering at a constant fixed rate, with a constant amount of resin in the constant volume of the CSTR for a constant time and a constant volume of resin is extracted from the CSTR and transferred to the next CSTR.

Preferably, the feed solution has a flow rate selected to provide a residence time of 5 to 10 minutes, typically 7 minutes in each CSTR.

Generally, the volume of the CSTR will be equal to the flow rate divided by eight. For example, for a flow rate of 63 $m^3/h$, the CSTR's will have a volume of 7.9 $m^3$.

DESCRIPTION OF EMBODIMENTS

According to the invention, a process for carrying out an ion exchange process involves providing two interacting sets of banks of continuously stirred tank reactors (CSTR's) each containing a bed of ion exchange resin and causing the resin to move in one direction through each bank of reactors and the feed solution and/or eluent in the opposite direction.

In carrying out the process, a feed solution is introduced in a first reactor causing dissolved ions to be captured on the resin, eluent will be introduced into a reactor upstream of the first reactor in the direction of resin movement causing ions captured on the resin to be removed into the eluent and eluent rich in ions removed from the resin will be taken from a reactor upstream of the reactor in which the eluent was introduced, for further processing. Thus, in this form of the invention there is, in effect, a loading bank of reactors in which ions from the feed solution are captured followed by a regenerating bank of reactors in which the eluent removes the ions captured on the resin and regenerates the resin.

In a preferred form of the invention, resin is removed from one or more of the reactors in the bank or banks of reactors in a manner which minimises or avoids shear to the resin. An example of such a method is with the use of an air-lift pump, preferably lifting the resin from the particular reactor on to a screen from which water can be removed and returned to the reactor.

The invention has particular application to the treatment of acid mine drainage (AMD) such as that described in International patent publication no. WO 2012/042483.

Figure 1:
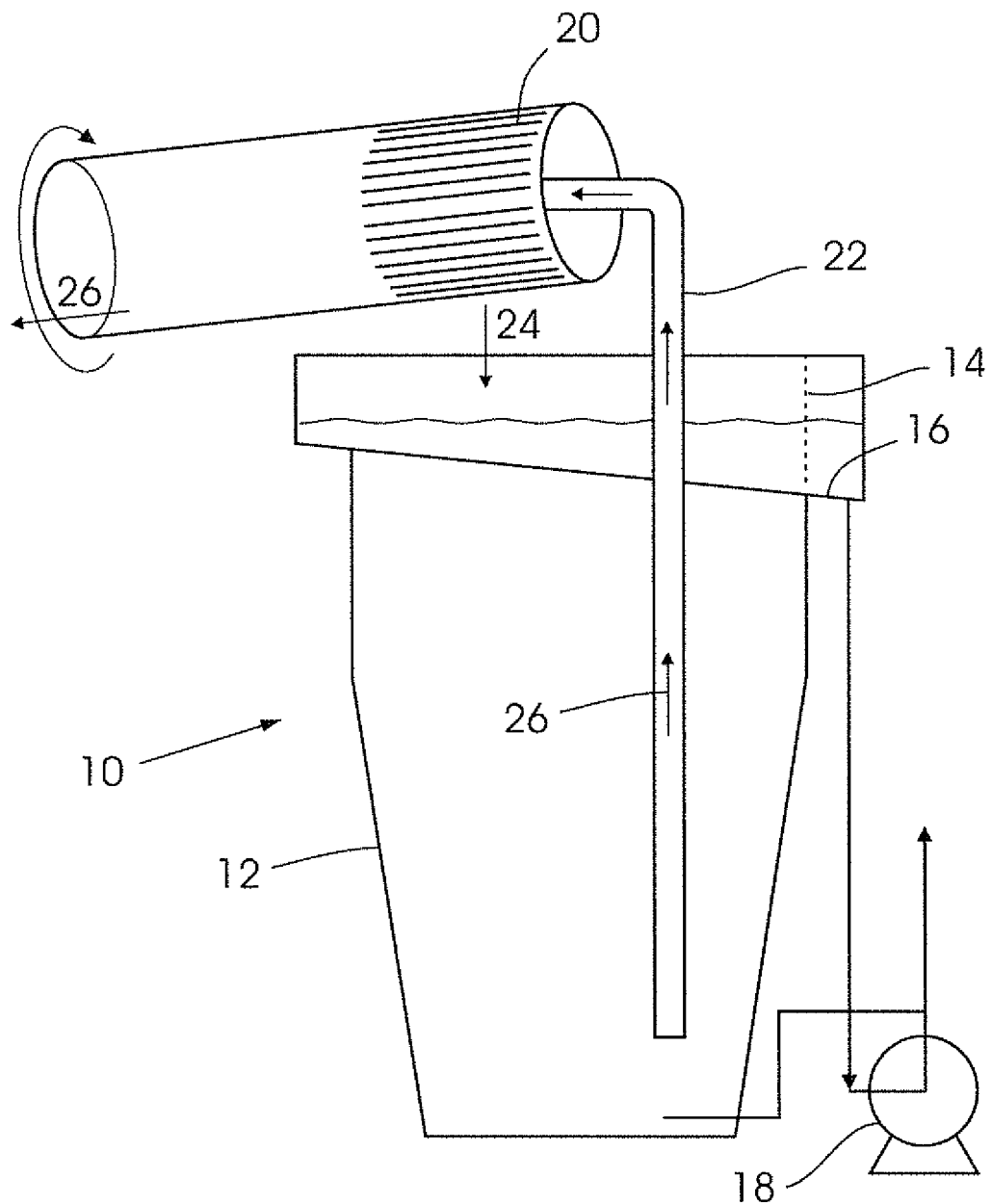
FIG. 1 illustrates diagrammatically an embodiment of a CSTR and a screen arrangement for removing resin from the CSTR for use in the process of the invention.

With reference to FIG. 1, a continuously stirred reactor (CSTR) is shown generally by the numeral 10. The CSTR comprises a tank 12 which contains water and an ion exchange resin (IOR). The ion exchange resin (IOR) is contained within the tank 12 by a screen 14 at the top of the tank that allows the water phase to overflow into a collection gutter 16 while the ion exchange resin (IOR) circulates inside the tank to give good mixing of the resin with the water phase to achieve the exchange needed. The IOR can be kept in suspension by designing the tank 12 in a conical fashion so that the vertical flow rate is greatest at the bottom of the tank and slowest at the top. It is also desirable to stir the contents by using an external pump 18 which only contacts the water phase thus ensuring that the IOR never gets sheared by a fast moving stirrer blade or pump impeller or is crushed in a hose pump or moving cavity pump.

The IOR is moved in counter-current fashion from one tank to another tank by lifting the resin onto a moving screen 20 using an air-lift pump 22 designed to lift the IOR in a very gentle fashion to once again avoid any shear. The moving screen 22 should be rotating in a drum (or "trommel") located above the original tank 12 so that the separated water phase 24 is dropped back into the same tank 12 but the IOR 26 moves without shear and without rinsing across to the next tank. Each tank will then operate in continuous fashion with a constant stream of feed water entering at a constant fixed rate, a constant amount of IOR will be in the constant volume tank for a constant amount of time and a constant amount of IOR will be extracted from the one tank to be transferred into the next tank thus keeping the conditions essentially constant for extended time periods. This method of operating obviates the necessity of real time analytical control, requires no suite of valves to be operated by a complex control system and can be monitored simply by a moderately skilled operator at extended time periods.

To avoid having contact with corrosive fumes and splashing liquids the rotating screen 20 can be rotated by using a water-wheel design running on the pumped reaction water. This water can drop back into the same tank giving motive energy without any extra energizing parts being needed to suffer from corrosion and cause breakdowns at inconvenient times.

Figure 2:
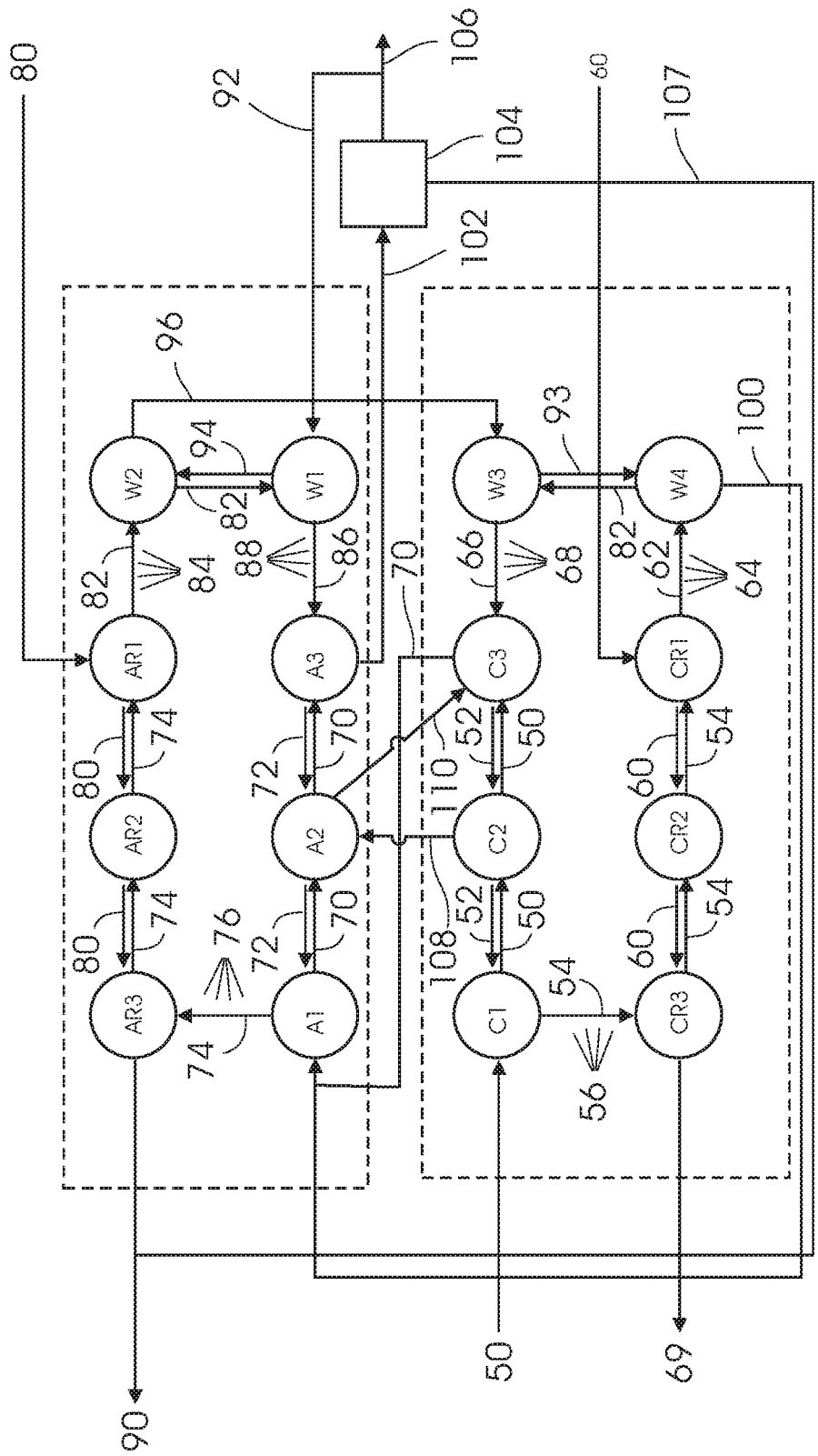
FIG. 2 illustrates a flow diagram of an embodiment of the invention.

A preferred embodiment of the invention will now be described with reference to the flow diagram of FIG. 2. In this embodiment of the invention, two sets of banks of CSTR's are provided:

The first set is designated "CATEX" and comprises CSTR's containing cation exchange resin:
  a loading bank of CSTR's C1 to C3 where loading of the resin takes place;
  a regenerating bank of CSTR's CR1 to CR3 in which eluent (regenerant) removes ions captured on the resin and thereby regenerates the resin; and
  between CSTR's C3 and CR1 are washing CSTR's W3 and W4 where washing of the resin can take place.

The second set is designated "ANEX" and comprises CSTR's containing anion exchange resin:
  a loading bank of CSTR's A1 to A3 where loading or the resin takes place;
  a regenerating bank of CSTR's AR3 to AR1 in which eluent (regenerant) removes ions captured on the resin and thereby regenerates the resin; and
  between CSTR's A3 and AR1 are washing CSTR's W1 and W2 where washing of the resin can take place.

An effluent feed 50 is added to the CATEX set of CSTR's at CSTR C1 and is moved continuously through the loading bank to the next CSTR C2 to the next CSTR C3. These CSTR's contain a cation exchange resin. While the effluent feed 50 moves through the CSTR's C1 to C3, cation exchange resin 52 flows continuously, counter-current to the effluent feed 50, from CSTR C3 to the next CSTR C2 to the next CSTR C1. The cation exchange resin gathers the cations, and loaded cation exchange resin 54 exits the loading bank at CSTR C1. The loaded cation exchange resin 54 is rinsed with water using a belt rinse 56. The belt rinse is sprayed with water, and a vacuum is used to remove excess water. When the resin 54 enters the belt rinse 56 it contains approximately 40% by mass water. 20% of the water is contained within the resin particles (absorbed inside the resin bead), and 20% of the water is interstitial (adsorbed onto the resin). The vacuum removes interstitial water.

The loaded resin 54 containing 20% water is added to the CSTR CR3 and is moved continuously through the regenerating bank to the next CSTR CR2 to the next CSTR CR3. While the resin 54 moves through the CSTR's CR3, to CR2, to CR1, eluent (regenerant) 60 in the form of nitric acid ($HNO_3$) is added to CSTR CR1 and flows continuously, counter-current to the resin 54, from CSTR CR1 to the next CSTR CR2 to the next CSTR CR3. The eluent 60 removes ions captured on the resin and thereby regenerates the resin, and a regenerated resin 62 exits the regenerating bank at CSTR CR1 and is passed through a belt rinse 64 (as described above) and then passes through washing CSTR's W3 and W4 which contain water, and the resin is washed. Regenerated and washed cation exchange resin 66 then passes through a belt rinse 68 (as described above) and is recirculated back to the loading bank at CSTR C3. Spent eluent 69 containing $NH_4NO_3$, $KNO_3$ and $NaNO_3$ exists from the regenerating bank at CSTR CR3.

An effluent feed stream 70 with cations removed and containing anions, in particular Cl and $SO_4$ is removed from the loading bank and the catex set at CSTR C3 and added to the loading bank of the anex set of CSTR's at CSTR A1 and is moved continuously through the loading bank to the next CSTR A2 to the next CSTR A3. The CSTR's in the anex set contain an anion exchange resin. While the effluent feed 70 moves through the CSTR's A1 to A3, anion exchange resin 72 flows continuously, counter-current to the effluent feed 50, from CSTR A3 to the next CSTR A2 to the next CSTR A1. The anion exchange resin gathers the anions, and loaded anion exchange resin 74 exits the loading bank at CSTR A1. The loaded anion exchange resin 74 is rinsed with water using a belt rinse 76 (as described above). The loaded resin 74 containing 20% water is added to the regeneration bank at CSTR AR3 and is moved continuously to the next CSTR AR2 to the next CSTR AR3. While the resin 74 moves through the CSTR's AR3, to AR2, to AR1, eluent (regenerant) 80 in the form of ammonium hydroxide ($NH_4OH$) is added to CSTR AR1 and flows continuously, counter-current to the resin 74, from CSTR AR1 to the next CSTR AR2 to the next CSTR AR3. The eluent 80 removes ions captured on the resin and thereby regenerates the resin, and a regenerated resin 82 passed through a belt rinse 84 (as described above) and passes through washing CSTR's W1 and W2 which contain water, and the resin is washed. Regenerated and washed anion exchange resin 86 then passes through a belt rinse 88 (as described above) and is recirculated back to the loading bank at CSTR A3. Spent eluent 90 containing $(NH_4)_2SO_4$, $NH_4Cl$ exits from the regenerating bank at CSTR AR3.

The process includes a water addition and recycling system. In the anex set, clean water 92 is added to washing CSTR W1 and water 94 from CSTR W1 flows countercurrent to the regenerated resin 82 into washing CSTR W2. Water 96 from CSTR W2 flows to washing CSTR W3 in the CATEX set. Water 93 from CSTR W3 flows countercurrent to the regenerated resin 62 into washing CSTR W4. From CSTR W4 water 100 containing $NO_3$, $SO_4$ and Cl flows to CSTR A1 in the CATEX set, where it is mixed with the effluent feed 70. Clean effluent water 102 flows from the regenerating bank of the anex set at CSTR A3. The pH of the effluent water 102 is adjusted with $H_2SO_4$ and this water is optionally treated in a reverse osmosis (RO) Unit 104, to provide clean water 106 which is recycled to the washing CSTR W1. Brine 107 from the RO Unit 104 is discharged with the spent eluent 90.

Effluent feed 108 from CSTR C2 in the loading bank of the CATEX set may be diverted to the CSTR A2 in the loading bank of the ANEX set, and effluent feed 110 from CSTR A2 in the loading bank of the ANEX set may be diverted to CSTR C3 in the loading bank of the CATEX set. This enhances the efficiency of extraction of the target cations as the exchanged hydrogen ions in the reacted water from CSTR C1 and C2 will be neutralized by the exchanged hydroxyl ions from CSTR A3 and A2. This maneuver reduces the free acidity from building up in the catex bank of reactors so increasing the available equilibrium for the extraction of heavier metal cations. It also eliminates the build-up of free hydroxyl ions in the anex bank of reactors thus increasing the rate of exchanging of target anions. This maneuver will speed up the process thus reducing the size of plant and the amount of resin required by as much as 30% which will substantially reduce the capital requirement of any plant but not its direct profitability.

The process of the present invention can operate successfully at very high concentrations—up to 175,000 ppm total dissolved solids (TDS) in the feed stream—and as the resin doesn't need rinsing, the process can recover in excess of 90% of the feed water. This can usually only be done at much lower TDS values when using normal column technology where feeds of above 10,000 ppm TDS become net water users (i.e. zero water recovery and huge evaporation charges for product recovery).

In an embodiment of the invention, the process is used to treat acid mine drainage (AMD). The mining industry is responsible for significant pollution of water which must be treated before it is discharged into the river systems. One of the ways water is polluted is as a result of rain water seeping through tailings dumps and dams into old, disused mine shafts. On passage through the tailings and rock faces, the water reacts with sulphides present in the rock producing sulphuric acid. The water which seeps into the old, disused mine shafts contains sulphuric acid and dissolved salts and can have a pH from 2 to 3. The mine shafts fill with the acidic water. Underground water sources are polluted with this acidic water. The shafts eventually fill with this acidic water and then overflows into the above-ground water ways causing serious problems. This acidic water is known as acid mine drainage (AMD), or acidic rock drainage (ARD) an acidic effluent of the mining industry. The process of the present invention may be used to treat AMD with a total dissolved solids content in excess of 10 000 ppm, and up to 30 000 to 40 0000, and a sodium ion content from 700 to 1000 ppm, for example AMD from a coal mine.

Acid mine drainage (AMD) with a pH of less than 3 is first neutralized to about 7 and precipitated solids which may comprise hydroxides and carbonates of calcium, magnesium, nickel, chromium, manganese and other heavy metals are filtered off. A resulting treated effluent feed 50 is then supplied to the CATEX reactor bank. For an AMD effluent with a TDS of 10 000 ppm, the effluent 50 has a flow rate of 3000 lt/r to provide a residence time of 5 to 10 minutes, typically 7 minutes in each CSTR. The size of the CSTR tanks depends on the rate of flow. Generally, the size of the CSTR will be ⅛ of the flow rate. For example, for a flow rate of 63 m3/h, the CSTR's will have a volume of 7.9 m$^3$. The cation exchange resin may be Amberjet™ 1500H which comprises spherical beads and is a gel type, cation exchange resin having a sulphonated styrene divinylbenzene copolymer structure with a mean particle size of 0.65 mm and a density of 1.22 gms/ml supplied by The Dow Chemical Company. The anion exchange resin may be Amberlite™ IRA 92 which comprises speherical beads with a macroporous polystyrene matrix (functional group: Secondary amine: at least 80%) having a mean particle size of 0.68 mm and a density of 1.05 gms/ml supplied by The Dow Chemical Company. The eluent 60 added at CSTR CR1 is 58% nitric acid ($HNO_3$). Eluent (regenerant) 80 is 30% ammonium hydroxide ($NH_4OH$).

The following advantages are believed to be achieved:
1. Full mixing (back-mixing) of each CSTR gives excellent equilibrium in each CSTR thus using the IOR with optimum efficiency
2. Any evolved $CO_2$ (when produced) does not cause a problem in the CSTR as the contents of the CSTR is intimately mixed (vs stationary column requirements) and releases the gas unnoticeably—a serious problem for a column IOR extraction process.
3. The separated resin is allowed to drain in the moving screen removing the need for rinsing of the IOR between stages.
4. Due to the low use of rinse water there is little or no dilution of the regenerant streams saving much energy requirement for concentrating to a dry saleable final product.
5. The CSTR handling of the IOR with an air-lift pump and moving screen is the gentlest process possible giving extended life to the expensive IOR's
6. The control of the process is reduced to a simple scheduled monitoring of basic variables at extended time spaces
7. The cost of the plant and, particularly, the controls is dramatically reduced
8. The addition of reverse osmosis (RO) as a final polishing step is low in operating cost, allows for greater optimisation of the ionex process and ensures continual high quality product water.
9. The return of the RO brine to the feed of the ionex process eliminates the difficult problem of finding a storage facility for this unwanted mixed waste stream.

The invention will now be illustrated in further detail with reference to the following non-limiting Example.

EXAMPLE

A mines effluent (raw feed) was treated with sodium carbonate to pH 8.5 to remove most of the multivalent cations and those anions that can easily be removed like phosphate and fluoride and the residue filtered off. The concentrated filter cake was removed and returned to the mine as immobilized backfill.

The filtrate was pumped to the ion exchange process described above and illustrated in FIGS. 1 and 2.

The loaded IX resins were regenerated using 20% nitric acid and 8% ammonia to give almost saturated (15%) solutions of sodium nitrate and (30%) ammonium sulfate for recovery of potassium nitrate and ammonium sulfate according to the process of WO 2012/042483.

Analyses of various water streams during IX processing (ppm).

| Analysis | Raw feed | After neutralization | After catex | After annex (final water) |
|---|---|---|---|---|
| H | 502 | 0 | 668 | 0 |
| Na | 250 | 16075 | 100 | 75 |
| K | 300 | 300 | 100 | 75 |
| Ca | 700 | 20 | 0 | 0 |
| Mg | 700 | 10 | 0 | 0 |
| Fe | 3000 | 0 | 0 | 0 |
| Cr | 30 | 0 | 0 | 0 |
| Mn | 30 | 0 | 0 | 0 |
| Al | 1100 | 0 | 0 | 0 |
| $SO_4$ | 32000 | 32000 | | 3 |
| $PO_4$ | 1220 | 0 | | 0 |
| $NO_3$ | 0 | 0 | | 0 |
| Cl | 300 | 300 | | 2 |
| F | 150 | 0 | | 0 |

The invention claimed is:

1. A process for treating an effluent feed solution containing dissolved cations and anions in two interacting sets of banks of continuously stirred tank reactors (CSTR's) comprising:
   a first set of banks of catex CSTR's containing a cation exchange resin and comprising:
      a loading bank of catex CSTR's in which cations from the effluent feed solution are captured, wherein the loading bank of catex CSTR's comprises a resin outlet catex CSTR and an effluent outlet catex CSTR, and
      a regenerating bank of catex CSTR's reactors in which an eluent removes the cations captured on the cation exchange resin and regenerates the cation exchange resin; and
   a second set of banks of anex CSTR's containing an anion exchange resin and comprising:
      a loading bank of anex CSTR's in which anions from a feed solution are captured, wherein the loading bank of anex CSTR's comprises a resin outlet anex CSTR and an effluent outlet anex CSTR, and a regenerating bank of anex CSTR's reactors in which an eluent removes the anions captured on the anion exchange resin and regenerates the anion exchange resin;

wherein:
i) the effluent feed solution containing dissolved cations and anions is passed through the loading bank of the catex CSTR's, and the cation exchange resin moves through the catex CSTR's countercurrent, in the opposite direction, to the effluent feed solution, causing dissolved cations to be captured on the cation exchange resin in each catex CSTR and for the effluent feed solution to flow from each catex CSTR to the next, to provide a loaded cation exchange resin in the resin outlet catex CSTR and an effluent feed solution depleted of cations in the effluent outlet catex CSTR;
ii) the loaded cation exchange resin in the resin outlet catex CSTR is passed through the regenerating bank of catex CSTR's to provide a regenerated cation exchange resin which is recycled to the effluent outlet catex CSTR of the loading bank of catex CSTR's;
iii) the effluent feed solution depleted of cations is passed from the effluent outlet catex CSTR to the resin outlet anex CSTR and through the loading bank of the anex CSTR's, and the anion exchange resin moves through the anex CSTR's countercurrent, in the opposite direction, to the effluent feed solution, causing dissolved anions to be captured on the anion exchange resin in each anex CSTR and for the effluent feed solution to flow from each anex CSTR to the next, to provide a loaded anion exchange resin in the resin outlet anex CSTR and an effluent feed solution depleted of cations and anions in the effluent outlet anex CSTR; and
iv) the loaded anion exchange resin in the resin outlet anex CSTR is passed through the regenerating bank of anex CSTR's to provide a regenerated anion exchange resin which is recycled to the effluent outlet anex CSTR of the loading bank of anex CSTR's; and wherein
effluent feed solution being partially depleted of cations is diverted from a catex CSTR in the loading bank of the catex set to an anex CSTR in the loading bank of the anex set, and the effluent feed solution being partially depleted of cations is diverted from an anex CSTR in the loading bank of the anex set to a catex CSTR in the loading bank of the catex set.

2. The process claimed in claim 1, wherein the loading bank of catex CSTR's, regenerating bank of catex CSTR's, loading bank of anex CSTR's and regenerating bank of anex CSTR's each comprise 2 to 8 CSTR's.

3. The process claimed in claim 1, wherein the loading bank of catex CSTR's, regenerating bank of catex CSTR's, loading bank of anex CSTR's and regenerating bank of anex CSTR's each comprise 3 to 4 CSTR's.

4. The process claimed in claim 1, wherein at least one CSTR adapted to wash regenerated resin is provided in between the regenerating bank and loading bank of catex CSTR's respectively.

5. The process claimed in claim 1, wherein 2 to 4 CSTR's adapted to wash regenerated resin are provided in between the regenerating bank and loading bank of catex CSTR's.

6. The process claimed in claim 1, wherein at least one washing CSTR adapted to wash regenerated resin is provided in between the regenerating bank and loading bank of anex CSTR's.

7. The process claimed in claim 1, wherein 1 to 4 washing CSTR's adapted to wash regenerated resin are provided in between the regenerating bank and loading bank of anex CSTR's.

8. The process claimed in claim 1, wherein, when the cation exchange resin is moved between the CSTR's in the loading bank of catex CSTR's, regenerating bank of catex CSTR's, or the anion exchange resin is moved between CSTR's in the loading bank of anex CSTR's and regenerating bank of anex CSTR's, the cation exchange resin or anion exchange resin is passed over a screen which separates eluent or effluent feed solution from the cation exchange resin or anion exchange resin by gravity and returns the eluent or effluent feed solution to the CSTR.

9. The process claimed in claim 4, wherein the cation exchange resin or anion exchange resin is rinsed with water and excess water removed using a vacuum at one or more of the following locations in the process:
between the loading bank and regenerating bank of catex CSTR's;
between the regenerating bank of catex CSTR's and the catex washing CSTR's;
between the catex washing CSTR's and catex loading bank of CSTR's;
between the loading bank and regenerating bank of anex CSTR's;
between the regenerating bank of anex CSTR's and the anex washing CSTR's;
between the anex washing CSTR's and anex loading bank of CSTR's.

10. The process claimed in claim 1 including a water addition and recycling system in which:
clean water is added to a washing CSTR connected to the loading bank of CSTR's in the anex set;
water from a washing CSTR connected to the regenerating bank of CSTR's in the anex set is added to a washing CSTR connected to the loading bank of CSTR's in the catex set;
water from a washing CSTR connected to the regenerating bank of CSTR's in the anex is added to the feed solution depleted of cations which is added to the loading bank of CSTR's in the anex set.

11. The process claimed in claim 1, wherein the feed solution is acid mine drainage (AMD).

12. The process claimed in claim 1, wherein the cation exchange resin is a strong acid ion exchange resin.

13. The process claimed in claim 1, wherein the anion exchange resin is a weak base ion exchange resin.

14. The process claimed in claim 1, wherein eluent in the catex regenerating bank of CSTR's is an acid.

15. The process claimed in claim 14, wherein the acid is nitric acid ($HNO_3$).

16. The process claimed in claim 15, wherein the acid is 10 to 20% nitric acid ($HNO_3$).

17. The process claimed in claim 1, wherein the eluent in the anex regenerating bank of CSTR's is a base.

18. The process claimed in claim 17, wherein the base is ammonium, sodium or potassium hydroxide.

19. The process claimed in claim 1, wherein the CSTR's in the first set of banks of catex CSTR's and in the second set of banks of anex CSTR's operate continuously with a constant stream of effluent feed solution or eluent entering at a constant fixed rate, with a constant amount of cation exchange resin or anion exchange resin in the constant volume of each CSTR for a constant time and a constant volume of cation exchange resin or anion exchange resin is extracted from the CSTR and transferred to the next CSTR.

20. The process claimed in claim 1, wherein the effluent feed solution or eluent has a flow rate selected to provide a residence time of 5 to 10 minutes in each CSTR.

21. The process claimed in claim 1, wherein the volume of each CSTR is equal to the flow rate divided by eight.

* * * * *